(12) United States Patent
Ito et al.

(10) Patent No.: US 11,899,880 B2
(45) Date of Patent: Feb. 13, 2024

(54) LIQUID CRYSTAL DISPLAY DEVICE

(71) Applicant: Japan Display Inc., Tokyo (JP)

(72) Inventors: Kaoru Ito, Tokyo (JP); Akihiko Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/989,851

(22) Filed: Nov. 18, 2022

(65) Prior Publication Data
US 2023/0088935 A1 Mar. 23, 2023

Related U.S. Application Data

(63) Continuation of application No. PCT/JP2021/015618, filed on Apr. 15, 2021.

(30) Foreign Application Priority Data

May 25, 2020 (JP) .................. 2020-090641

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 3/0412* (2013.01)

(58) Field of Classification Search
CPC ... G06F 3/041662; G06F 3/0412; G06F 3/044
See application file for complete search history.

(56) References Cited

U.S. PATENT DOCUMENTS

| 9,891,744 B2 | 2/2018 | Noto | |
|---|---|---|---|
| 2012/0320297 A1* | 12/2012 | Itsumi | G09G 3/3648 349/43 |
| 2014/0078421 A1 | 3/2014 | Zhou | |

(Continued)

FOREIGN PATENT DOCUMENTS

| CN | 110568961 A | 12/2019 |
|---|---|---|
| JP | 2014-115647 A | 6/2014 |
| JP | 2015-225381 A | 12/2015 |

OTHER PUBLICATIONS

International Search Report issued in International Patent Application No. PCT/JP2021/015618 dated Jul. 6, 2021 and English translation of same. 7 pages.

(Continued)

*Primary Examiner* — Afroza Chowdhury
(74) *Attorney, Agent, or Firm* — K&L Gates LLP

(57) ABSTRACT

A liquid crystal display device includes a liquid crystal layer provided between a first substrate and a second substrate, a detection electrode configured to detect an external proximity object, a plurality of pixels overlapping the detection electrode in plan view, and a detection circuit configured to detect a detected capacitance value generated in the detection electrode. A liquid crystal capacitance value generated between each of the pixels and the detection electrode includes a first capacitance value at a first gradation and a second capacitance value at a second gradation smaller than the first gradation, and the detection circuit corrects the detected capacitance value based on a ratio between number of pixels with the first gradation and number of pixels with the second gradation out of the pixels.

12 Claims, 13 Drawing Sheets

(56) References Cited

U.S. PATENT DOCUMENTS

| | | |
|---|---|---|
| 2014/0160061 A1 | 6/2014 | Kim et al. |
| 2014/0210771 A1 | 7/2014 | Kim et al. |
| 2015/0185939 A1 | 7/2015 | Han et al. |
| 2016/0085374 A1 | 3/2016 | Ma et al. |
| 2017/0316727 A1* | 11/2017 | Mizusako ............ G09G 3/3677 |
| 2019/0206349 A1* | 7/2019 | An ....................... G09G 3/3614 |

OTHER PUBLICATIONS

Written Opinion issued in International Patent Application No. PCT/JP2021/015618 dated Jul. 6, 2021. 3 pages.

* cited by examiner

| | $\alpha\ (=P_L(n)/P_{ST}(r))$ |
|---|---|
| t+1 | $\alpha(t+1)$ |
| t+2 | $\alpha(t+2)$ |
| ⋮ | ⋮ |
| N | $\alpha(N)$ |

| PIXEL VALUE | Cg |
|---|---|
| 255 | Cg(255) |
| 254 | Cg(254) |
| ⋮ | ⋮ |
| 0 | Cgref |

FIG.20

| GATE LINE | $P_L(n)$ |
|---|---|
| 1 | $P_L(1)$ |
| 2 | $P_L(2)$ |
| ⋮ | ⋮ |
| N | $P_L(N)$ |

LIQUID CRYSTAL DISPLAY DEVICE

CROSS-REFERENCE TO RELATED APPLICATION

This application is a continuation of International Patent Application No. PCT/JP2021/015618 filed on Apr. 15, 2021 which designates the United States, incorporated herein by reference, and which claims the benefit of priority from Japanese Patent Application No. 2020-090641 filed on May 25, 2020, incorporated herein by reference.

BACKGROUND

1. Technical Field

The present invention relates to a liquid crystal display device.

2. Description of the Related Art

Touch detection devices capable of detecting an external proximity object, what are called touch panels, have recently been attracting attention. Touch panels are used in a manner mounted on or integrated with a liquid crystal display device. Various touch detection methods are known, including a capacitance method for detecting the coordinates of a touch by detecting change in capacitance generated by a human finger or the like coming closer to the touch panel (e.g., Japanese Patent Application Laid-open Publication No. 2015-225381).

In the capacitance touch detection method, change in voltage generated by the capacitance value of detection electrodes provided on the panel is integrated by an integration circuit and AD conversion is performed on the integrated value to obtain a detected value. A configuration that integrates a display panel provided with liquid crystal display elements as display elements and a touch panel that detects touch input typically has display periods for displaying images and detection periods for performing touch detection in a time-division manner and uses common electrodes that supply a common potential to pixel electrodes also as electrodes for touch detection. If the pixel electrodes and the common electrodes in this configuration are disposed with a liquid crystal layer interposed therebetween, the permittivity of the liquid crystal layer may possibly change due to display operations. In particular, a vertical-electric-field liquid crystal layer, such as layers of vertical alignment (VA) and electrically controlled birefringence (ECB), has high dependence on change in the detected capacitance value due to change in permittivity of the liquid crystal layer. The change in permittivity of the liquid crystal layer may possibly affect the capacitance value of the detection electrodes in touch detection, thereby preventing touch detection from being performed properly.

In view of the disadvantages described above, an object of the present disclosure is to provide a liquid crystal display device that can suppress deterioration in detection accuracy due to change in the capacitance value of detection electrodes caused by display operations.

SUMMARY

A liquid crystal display device according to an embodiment of the present disclosure includes a liquid crystal layer provided between a first substrate and a second substrate, a detection electrode configured to detect an external proximity object, a plurality of pixels overlapping the detection electrode in plan view, and a detection circuit configured to detect a detected capacitance value generated in the detection electrode. A liquid crystal capacitance value generated between each of the pixels and the detection electrode includes a first capacitance value at a first gradation and a second capacitance value at a second gradation smaller than the first gradation, and the detection circuit corrects the detected capacitance value based on a ratio between number of pixels with the first gradation and number of pixels with the second gradation out of the pixels.

A liquid crystal display device according to an embodiment of the present disclosure includes a liquid crystal layer provided between a first substrate and a second substrate, a detection electrode configured to detect an external proximity object, a plurality of pixels overlapping the detection electrode in plan view, and a detection circuit configured to detect a detected capacitance value generated in the detection electrode. A capacitance value at a predetermined gradation of each of the pixels is used as a reference capacitance value of a liquid crystal capacitance value generated between the pixel and the detection electrode, and the detection circuit corrects the detected capacitance value by calculating, for each of the pixels, a difference between the liquid crystal capacitance value of the pixel at a detection timing of the detected capacitance value and the reference capacitance value, adding up the differences of the respective pixels, and subtracting the added value from the detected capacitance value.

BRIEF DESCRIPTION OF THE DRAWINGS

FIG. 20 is a diagram of an example of a first period table for scanning lines to which each pixel is coupled.

DETAILED DESCRIPTION

Figure 1:
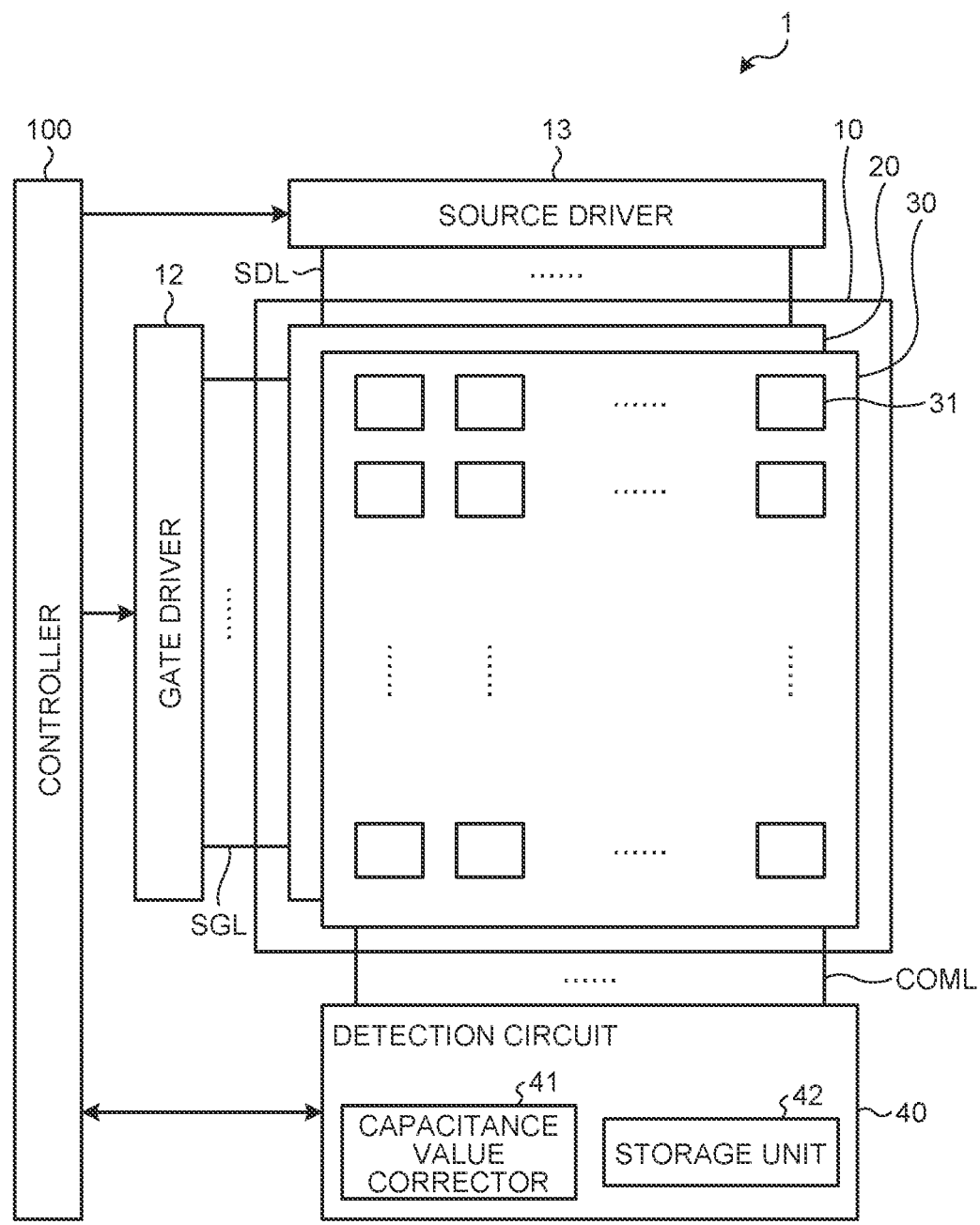
FIG. 1 is a block diagram of an example of the configuration of a liquid crystal display device according to an embodiment.

An exemplary aspect (embodiment) to embody the present disclosure is described below in greater detail with reference to the accompanying drawings. The contents described in the embodiment are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be appropriately omitted.

Embodiments

FIG. 1 is a block diagram of an example of the configuration of a liquid crystal display device according to an embodiment.

As illustrated in FIG. 1, a liquid crystal display device 1 includes a display panel 10, a gate driver 12, a source driver 13, and a detection circuit 40. The display panel 10 includes a display area 20 that displays images and a sensor device 30 that detects an external proximity object on a detection surface.

The display panel 10 is what is called an in-cell or hybrid device that integrally incorporates the capacitance sensor device 30 with the display area 20. Specifically, for example, some members, such as substrates and electrodes, used as the display area 20 also serve as some members, such as substrates and electrodes, used as the sensor device 30.

Figure 2:
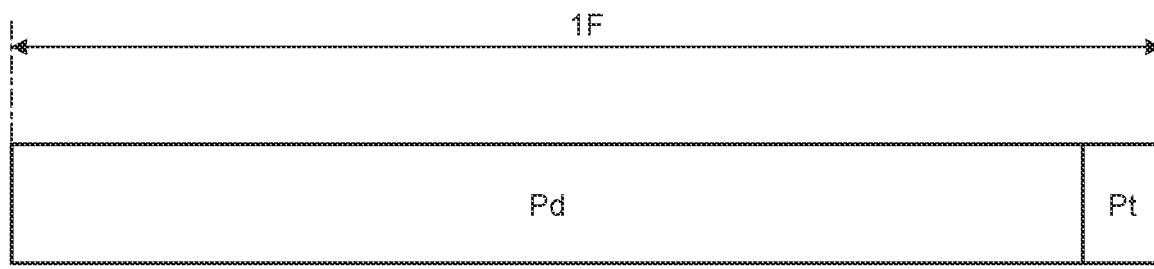
FIG. 2 is a diagram of an example of a display period and a detection period in one frame period.

FIG. 2 is a diagram of an example of a display period and a detection period in one frame period. As illustrated in FIG. 2, the display panel 10 according to the present embodiment has a display period Pd and a detection period Pt in a time-division manner in one frame period 1F. The display period Pd is a period for displaying images on the display area 20. The detection period Pt is a period for performing touch detection by the sensor device 30. Thus, the display panel 10 performs both a display operation and a detection operation. The example of time division between the display period Pd and the detection period Pt illustrated in FIG. 2 is given by way of example only, and the present embodiment is not limited thereto.

The display area 20 includes a plurality of pixels for displaying images. The display area 20 receives video signals and displays images. The display area 20 according to the present embodiment is a vertical-electric-field liquid crystal display device, such as devices of vertical alignment (VA) and electrically controlled birefringence (ECB), provided with liquid crystal display elements as display elements constituting pixels. The display area 20 may be a horizontal-electric-field liquid crystal display device, such as a device of in-plane switching (IPS) including fringe field switching (FFS).

The sensor device 30 includes a plurality of detection electrodes 31. The detection electrodes 31 are coupled to the detection circuit 40. While the detection electrodes 31 are disposed in a matrix (row-column configuration) in FIG. 1, the arrangement of the detection electrodes 31 is not limited thereto. Specifically, the detection electrodes 31 may be provided extending in the horizontal or vertical direction of the sensor device 30 illustrated in FIG. 1, for example.

Figure 3:
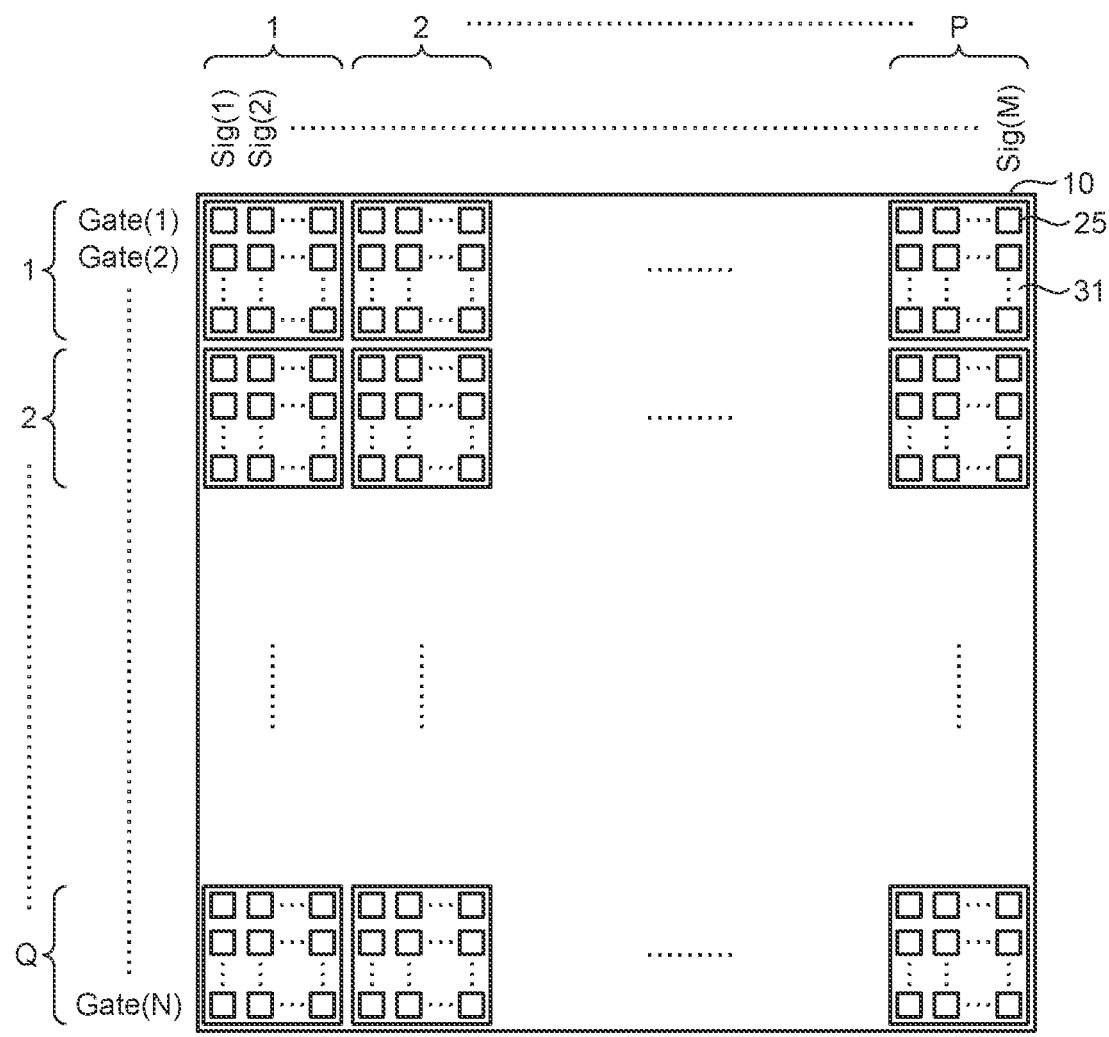
FIG. 3 is a transparent view of a display panel.

FIG. 3 is a transparent view (perspective view) of the display panel. In the example illustrated in FIG. 3, a plurality of detection electrodes 31 are arrayed in a P×Q matrix (row-column configuration) on the detection surface of the sensor device 30, and pixels 25 are arrayed in an M×N matrix (row-column configuration) on the display surface of the display area 20. A plurality of pixels 25 are disposed overlapping one detection electrode 31. In other words, the detection electrodes 31 each overlap a plurality of pixels 25 in plan view.

In FIG. 1, a controller 100 supplies control signals to the gate driver 12, the source driver 13, and the detection circuit 40. The controller 100 is a circuit that controls the display operation and the detection operation. The controller 100 may be configured by a host integrated circuit (IC), for example.

The gate driver 12 is a circuit that supplies scanning signals Gate(1), Gate(2), . . . , and Gate(N) to the display panel 10 based on the control signals supplied from the controller 100. More specifically, the gate driver 12 sequentially or simultaneously selects a plurality of scanning lines SGL as a target to be driven for display in the display period Pd and supplies the scanning signals Gate(1), Gate(2), . . . , and Gate(N) to the selected scanning lines SGL. Each scanning line SGL is coupled to a plurality of pixels.

The source driver 13 is a circuit that supplies pixel signals Sig(1), Sig(2), . . . , and Sig(M) to the pixels of the display area 20 based on the control signals supplied from the controller 100. More specifically, the source driver 13 supplies the pixel signals Sig(1), Sig(2), . . . , and Sig(M) via signal lines SDL to the pixels coupled to the scanning line SGL selected by the gate driver 12 in the display period Pd. Each signal line SDL is coupled to a plurality of pixels. Some of the functions of the source driver 13 may be mounted on the display panel 10.

Figure 4:
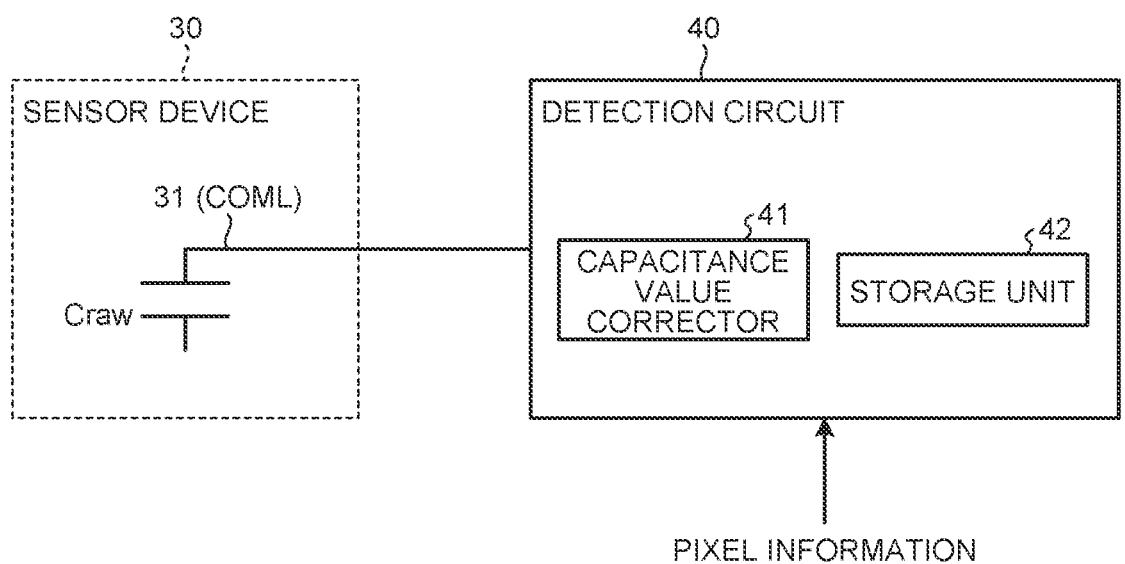
FIG. 4 is a schematic of an example of coupling between a detection electrode of a sensor device and a detection circuit.

The detection circuit 40 may be configured by a detection integrated circuit (IC), for example. FIG. 4 is a schematic of an example of coupling between the detection electrode of the sensor device and the detection circuit. FIG. 4 illustrates one of the detection electrodes 31 provided to the sensor device 30. The detection circuit 40 according to the present embodiment includes at least a capacitance value corrector (a capacitance value correcting circuit) 41 and a storage circuit 42. The capacitance value corrector 41 detects a detected capacitance value Craw generated in the detection electrode 31 and corrects the detected capacitance value Craw. The storage unit 42 stores therein various parameters for correcting the detected capacitance value Craw. The capacitance value corrector 41 corrects the detected capacitance value Craw using pixel information received from the controller 100 and various parameters stored in the storage unit 42, for example. The detected capacitance value Craw may be a capacitance value based on a value output from the detection circuit 40. The detection circuit 40 may also include a signal processor (a signal processing circuit), a coordinate extractor (a coordinate extract circuit), a detection timing controller (a detection timing control circuit), and other elements as components for detecting an external proximity object on the detection surface of the sensor device 30.

Figure 5:
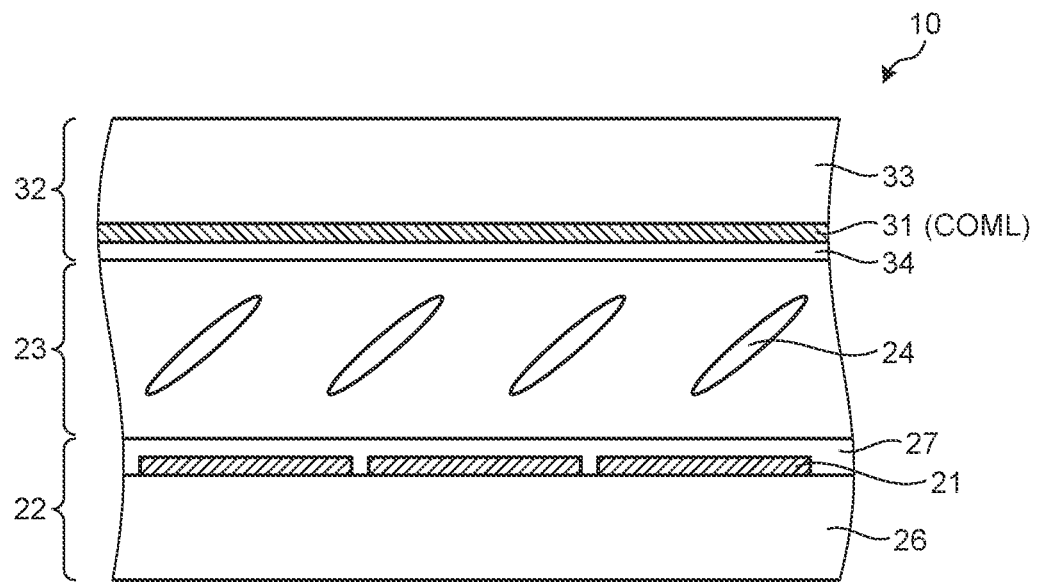
FIG. 5 is a schematic of a sectional structure of the display panel with which touch detection is performed by a self-capacitive method.
Figure 6:
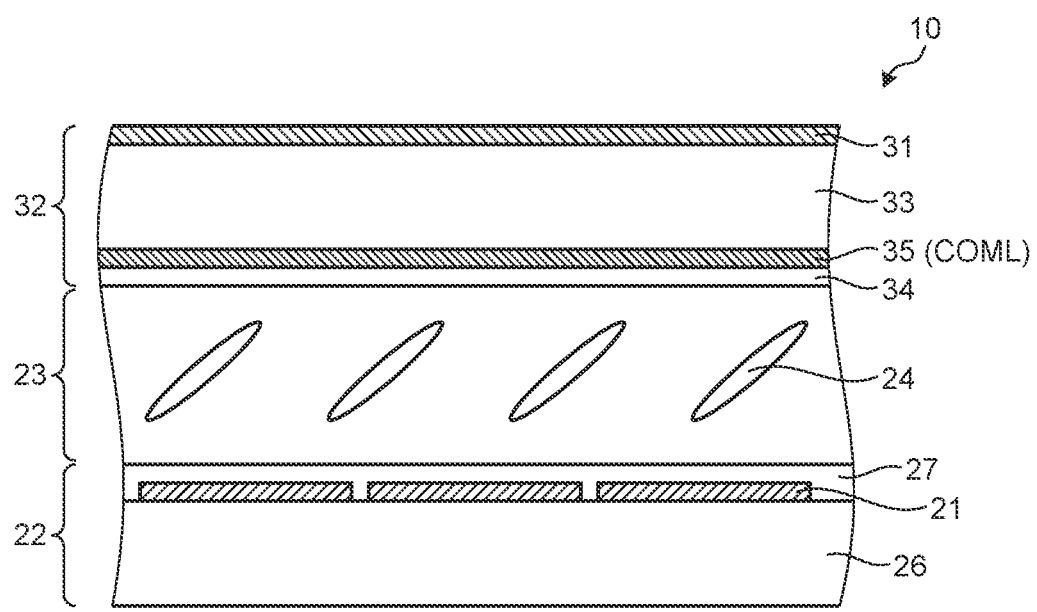
FIG. 6 is a schematic of a sectional structure of the display panel with which touch detection is performed by a mutual capacitive method.

The detection circuit 40 according to the present embodiment detects an external proximity object on the detection surface of the sensor device 30 based on the basic principle of touch detection by what is called a self-capacitive method or a mutual capacitive method. FIG. 5 is a schematic of a sectional structure of the display panel with which touch detection is performed by the self-capacitive method. FIG. 6 is a schematic of a sectional structure of the display panel with which touch detection is performed by the mutual capacitive method. While the display panel 10 according to the present embodiment is a vertical-electric-field reflective liquid crystal display device, for example, the display panel 10 is not limited to a reflective liquid crystal display device. The display panel 10 may be a transmissive liquid crystal display device or a transflective liquid crystal display device. In FIGS. 5 and 6, some components are not illustrated, such as polarizing plates.

As illustrated in FIGS. 5 and 6, the display panel 10 includes an array substrate (first substrate) 22, a counter substrate (second substrate) 32, and a liquid crystal layer 23. The counter substrate 32 faces the array substrate 22 in a direction perpendicular to the surface of the array substrate 22. In the display panel 10, the liquid crystal layer 23 is sandwiched between the array substrate 22 and the counter substrate 32.

The array substrate 22 includes a first orientation film 27. The counter substrate 32 include a second orientation film 34. The first orientation film 27 and the second orientation film 34 are vertical orientation films, for example.

The array substrate 22 includes a base material 26. If the display panel 10 is a transmissive liquid crystal display device that outputs light from the back surface of the array substrate 22 using a backlight, the base material 26 may be a translucent base material made of glass, for example. In this case, the base material 26 may be resin, such as polyethylene terephthalate, as long as it is translucent.

The array substrate 22 includes pixel electrodes 21 on the surface of the base material 26 facing the liquid crystal layer 23. The pixel electrode 21 is made of metal material having a light-reflecting property. The first orientation film 27 is provided on the surface of the pixel electrode 21. Light incident from the counter substrate 32 is reflected by the pixel electrode 21 and passes through the counter substrate 32 to reach the observer's eyes. If the display panel 10 is a transmissive liquid crystal display device, the pixel electrode 21 may be made of translucent conductive material, such as ITO.

The counter substrate 32 includes a translucent base material 33 made of glass, for example. The translucent base material 33 may be resin, such as polyethylene terephthalate, as long as it is translucent.

In the configuration that performs touch detection by the self-capacitive method illustrated in FIG. 5, the counter substrate 32 includes the detection electrode 31 on the surface of the translucent base material 33 facing the liquid crystal layer 23. The detection electrode 31 is made of translucent conductive material, such as ITO. The second orientation film 34 is provided on the surface of the detection electrode 31. The detection electrode 31 operates as a common electrode COML that supplies a common potential to the pixel electrodes of the respective pixels 25 in the display period Pd.

In the configuration that performs touch detection by the mutual capacitive method illustrated in FIG. 6, the counter substrate 32 includes a drive electrode 35 on the surface of the translucent base material 33 facing the liquid crystal layer 23. The drive electrode 35 is made of translucent conductive material, such as ITO. The second orientation film 34 is provided on the surface of the drive electrode 35. The drive electrode 35 operates as the common electrode COML that supplies a common potential to the pixel electrodes of the respective pixels 25 in the display period Pd.

The counter substrate 32 includes the detection electrode 31 on the surface of the translucent base material 33 opposite to the liquid crystal layer 23. The detection electrode 31 is made of translucent conductive material, such as ITO.

The detection circuit 40 detects an external proximity object on the detection surface of the sensor device 30 based on the detected capacitance value Craw generated in the detection electrode 31 of the sensor device 30 in the detection period Pt. The component that supplies the common potential to the common electrode COML (the detection electrode 31 in the configuration illustrated in FIG. 5 or the drive electrode 35 in the configuration illustrated in FIG. 6) in the display period Pd may be the detection circuit 40 or another component other than the detection circuit 40. The following describes a specific concept of the present disclosure using the configuration that performs touch detection by the self-capacitive method illustrated in FIG. 5 as an example.

Figure 7:
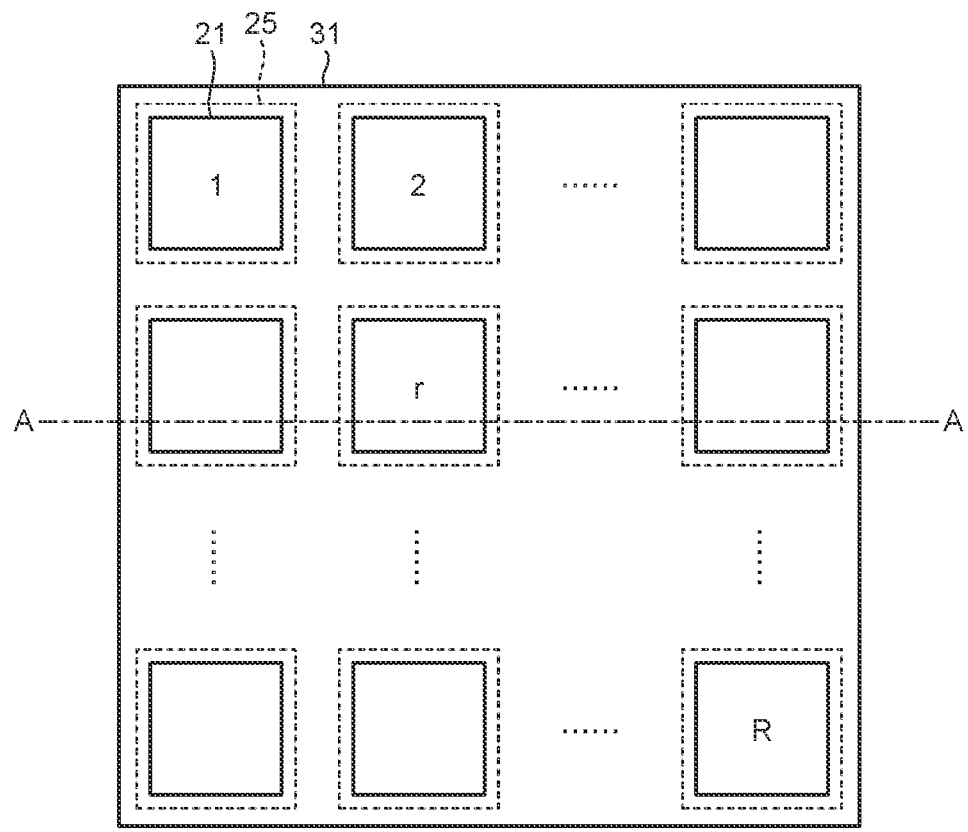
FIG. 7 is an enlarged transparent view of one detection electrode on the display panel.
Figure 8:
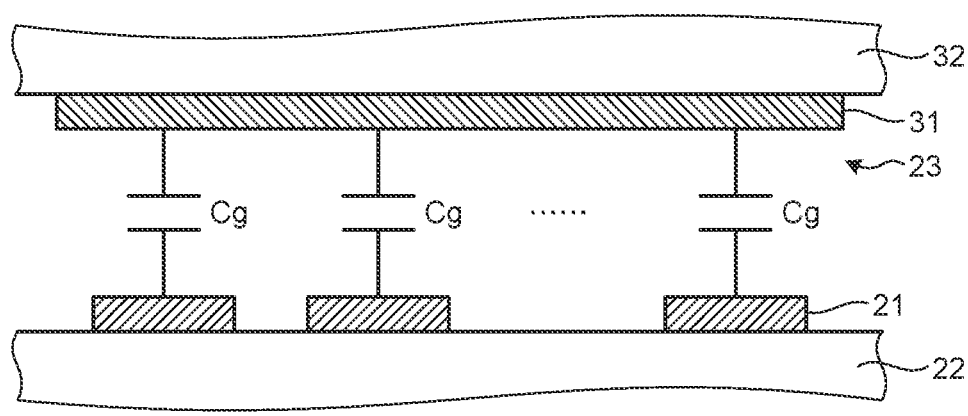
FIG. 8 is a sectional schematic along line A-A of FIG. 7.

FIG. 7 is an enlarged transparent view of one detection electrode on the display panel. FIG. 8 is a sectional schematic along line A-A of FIG. 7. FIG. 7 illustrates an example where R pixels 25 overlap one detection electrode 31. In FIG. 8, some components are not illustrated, such as orientation films and polarizing plates.

A liquid crystal capacitance value Cg corresponding to the permittivity of the liquid crystal layer 23 is generated between the pixel electrode 21 and the detection electrode 31. In other words, the detected capacitance value Craw generated in the detection electrode 31 of the sensor device 30 in the detection period Pt includes the sum of the liquid crystal capacitance values Cg of the respective pixels 25 overlapping the detection electrode 31.

Figure 9:
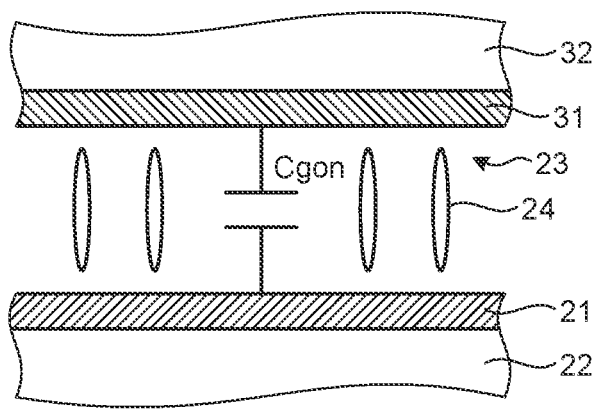
FIG. 9 is a diagram of a liquid crystal capacitance value in a display ON state in each pixel.
Figure 10:
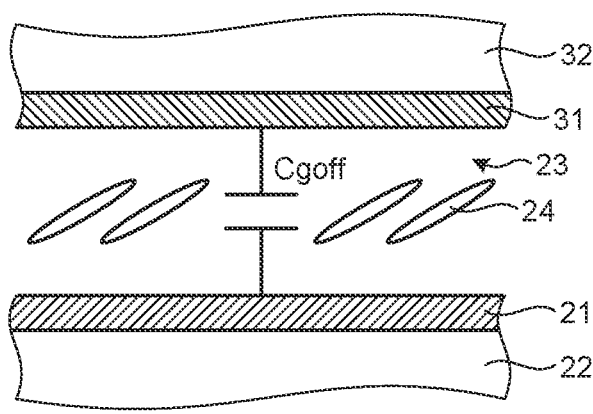
FIG. 10 is a diagram of the liquid crystal capacitance value in a display OFF state in each pixel.

FIG. 9 is a diagram of the liquid crystal capacitance value in a display ON state in each pixel. FIG. 10 is a diagram of the liquid crystal capacitance value in a display OFF state in each pixel.

In a vertical-electric-field liquid crystal display device, the permittivity of the liquid crystal layer 23 changes depending on the orientation direction of liquid crystal molecules 24. Therefore, a liquid crystal capacitance value Cgon in the display ON state illustrated in FIG. 9 is different from the liquid crystal capacitance value Cgoff in the display OFF state illustrated in FIG. 10. More specifically, the liquid crystal capacitance value Cgon in the display ON state is larger than the liquid crystal capacitance value Cgoff in the display OFF state (Cgon>Cgoff). As a result, the sum of the liquid crystal capacitance values Cg included in the detected capacitance value Craw generated in the detection electrode 31 of the sensor device 30 in the detection period Pt varies depending on the image displayed on the display area 20 in the display period Pd, thereby preventing touch detection from being performed properly.

The display ON state according to the present embodiment is a state where the direction of the long axis of the liquid crystal is at a first angle or larger with respect to the facing surfaces of the array substrate 22 and the counter substrate 32. The display OFF state is a state where the direction of the long axis of the liquid crystal is at a second angle or smaller with respect to the facing surfaces of the array substrate 22 and the counter substrate 32. The second angle is smaller than the first angle.

In positive liquid crystals having positive dielectric anisotropy of the liquid crystals, a voltage equal to or higher than a first voltage is applied between the pixel electrode 21 and the detection electrode 31 in the display ON state, and a voltage equal to or lower than a second voltage is applied between the pixel electrode 21 and the detection electrode 31 in the display OFF state. The second voltage is lower than the first voltage.

In negative liquid crystals having negative dielectric anisotropy of the liquid crystals, a voltage equal to or higher than a first voltage is applied between the pixel electrode 21 and the detection electrode 31 in the display OFF state, and a voltage equal to or lower than a second voltage is applied between the pixel electrode 21 and the detection electrode 31 in the display ON state. The second voltage is lower than the first voltage.

When the displayable gradations are 0% to 100%, the display OFF state is set to a gradation of 5% or smaller, and the display ON state is set to a gradation of 95% or larger, for example. When the displayable gradations are 0% to 100%, the accuracy can be improved by setting the display OFF state to a gradation of 1% or smaller and setting the display ON state to a gradation of 99% or larger, for example. Ideally, when the displayable gradations are 0% to 100%, the display OFF state is set to a gradation of 0%, and the display ON state is set to a gradation of 100%, for example. In monochrome liquid crystals, black is displayed in the display OFF state, and white is displayed in the display ON state. In color liquid crystals, the OFF state and the ON state are defined by the gradation value of each color component.

The detection circuit 40 according to the present embodiment corrects the detected capacitance value Craw generated in the detection electrode 31 according to the image displayed on the display area 20 and performs the detection operation based on the corrected capacitance value resulting from correction. The following describes a concept of correcting the detected capacitance value Craw generated in the detection electrode 31. In the following description, each value in the S-th frame (S is an integer value) is provided with "S". For example, the detected capacitance value generated in the detection electrode 31 in the S-th frame is represented by "$Craw_S$"

Specifically, the present embodiment determines the liquid crystal capacitance value Cgoff in the display OFF state to be a reference capacitance value Cgref, calculates a difference $\Delta Cg_S(r)$ between a liquid crystal capacitance value $Cg_{Sre}(r)$ at a detection timing and the reference capacitance value Cgref for each of the pixels 25, adds up the differences $\Delta Cg_S(r)$ calculated for the respective pixels 25, and subtracts the added value from the detected capacitance value $Craw_S$. Therefore, a corrected capacitance value $Ccor_S$ can be calculated by considering that all the pixels 25 overlapping the detection electrode 31 are in the display OFF state independently of the image displayed on the display area 20. The corrected capacitance value $Ccor_S$ can be expressed by the following Expressions (1) and (2):

$$Ccor_S = Craw_S - \sum_{r=1}^{R} \Delta Cg_S(r) \tag{1}$$

$$\Delta Cg_S(r) = Cg_{Sre}(r) - Cgref \tag{2}$$

Let us first assume a case where the image displayed on the display area 20 is a two-gradation still image composed of the pixels 25 in the display OFF state and the pixels 25 in the display ON state. When $R_1$ is the number of pixels with a first gradation in the display ON state out of the R pixels 25 disposed overlapping one detection electrode 31, $R_2$ is the number of pixels with a second gradation in the display OFF state, $\Delta Cg_{S1}(r)$ is the difference between the liquid crystal capacitance value $Cg_{Sre1}(r)$ of the pixels 25 with the first gradation in the display ON state and the reference capacitance value Cgref, and $\Delta Cg_{S2}(r)$ is the difference between the liquid crystal capacitance value $Cg_{Sre2}(r)$ of the pixels 25 with the second gradation in the display OFF state and the reference capacitance value Cgref, the above Expression (1) can be expressed by the following Expression (3):

$$Ccor_S = Craw_S - (R_1 \times \Delta Cg_{S1}(r) + R_2 \times \Delta Cg_{S2}(r)) \tag{3}$$

In other words, the corrected capacitance value $Ccor_S$ is determined by the ratio between the number $R_1$ of the pixels with the first gradation in the display ON state and the number $R_2$ of the pixels with the second gradation in the display OFF state out of the pixels 25 constituting the image displayed on the display area 20. When the liquid crystal capacitance value Cgoff in the display OFF state is determined to be the reference capacitance value Cgref as described above, $\Delta Cg_{S2}(r)$ expressed by the above Expression (2) is 0 in the pixels 25 with the second gradation in the display OFF state. In other words, the above Expression (3) can be expressed by the following Expression (4):

$$Ccor_S = Craw_S - R_1 \times \Delta Cg_{S1}(r) \tag{4}$$

In other words, when the image displayed on the display area 20 is a still image composed of the pixels with the second gradation in the display OFF state and the pixels with the first gradation in the display ON state, the corrected capacitance value $Ccor_S$ can be calculated by: integrating the differences $\Delta Cg_{S1}(r)$ between the liquid crystal capacitance value $Cg_{Sre1}(r)(=Cgon)$ of the pixels 25 with the first gradation in the display ON state and the reference capacitance value Cgref for the number $R_1$ of the pixels with the first gradation in the display ON state and subtracting the integrated value from the detected capacitance value $Craw_S$.

Next, let us assume a case where the state of each of the pixels 25 constituting the image displayed on the display area 20 changes between frames.

When the state of each of the pixels 25 constituting the image displayed on the display area 20 changes between frames, the liquid crystal capacitance value $Cg_{Sre}(r)$ of each of the pixels 25 included in the detected capacitance value Craw$_S$ detected in the detection period Pt differs depending on a selection timing Tpd of the pixel 25.

Figure 11:
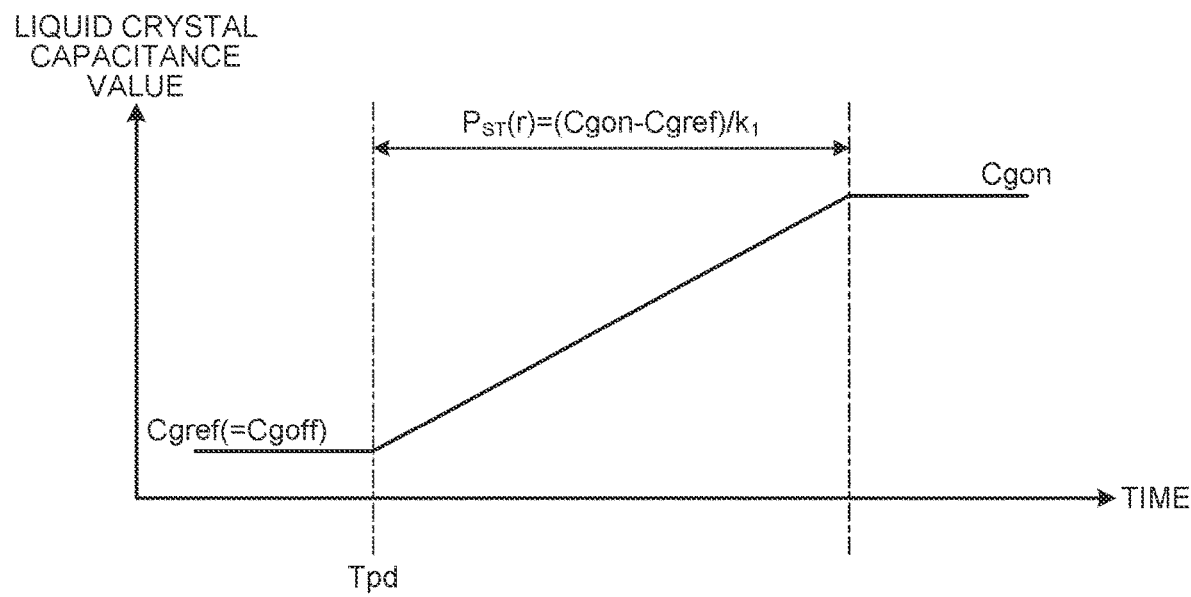
FIG. 11 is a diagram of an example of change in liquid crystal capacitance when the state of the pixel is controlled from the display OFF state to the display ON state.
Figure 12:
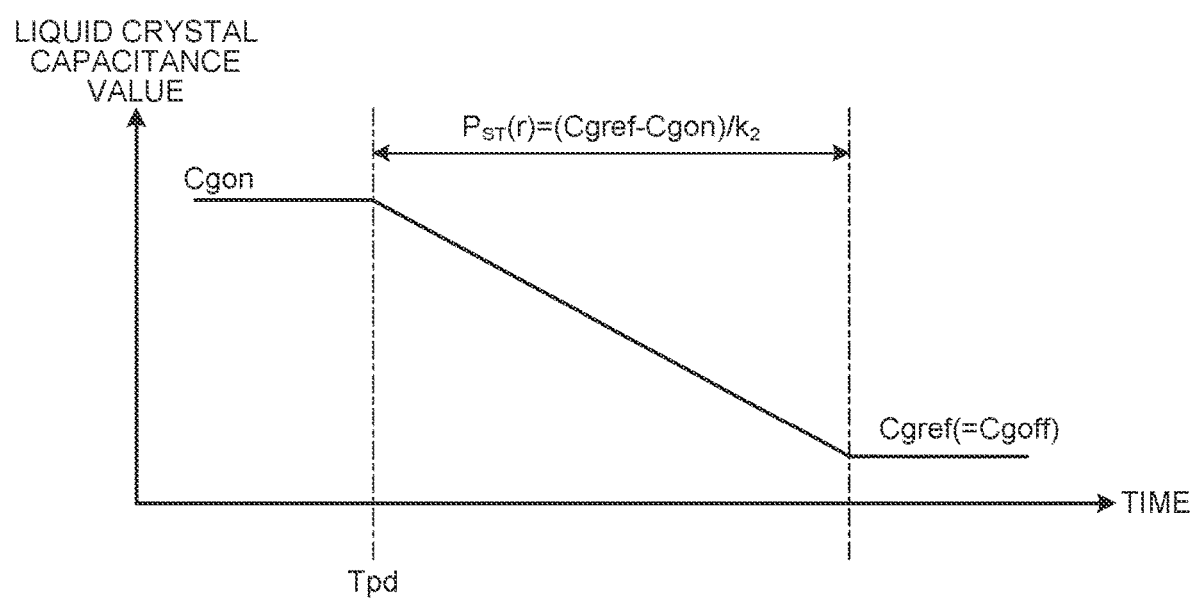
FIG. 12 is a diagram of an example of change in liquid crystal capacitance when the state of the pixel is controlled from the display ON state to the display OFF state.

Each pixel 25 is controlled to be in the display ON state or the display OFF state in the display period Pd. If the display period Pd and the detection period Pt are arranged in a time-division manner in one frame period 1F as illustrated in FIG. 2, for example, and the display state in the display period Pd of the current frame period is different from that in the previous frame period, the liquid crystal capacitance value Cg changes at a predetermined inclination corresponding to the response speed of the liquid crystal layer 23 over time. FIG. 11 is a diagram of an example of change in liquid crystal capacitance when the state of the pixel is controlled from the display OFF state to the display ON state. FIG. 12 is a diagram of an example of change in liquid crystal capacitance when the state of the pixel is controlled from the display ON state to the display OFF state.

As illustrated in FIG. 11, the pixel 25 controlled from the display OFF state to the display ON state is controlled from the display OFF state to the display ON state at the selection timing Tpd of the pixel 25. Similarly, as illustrated in FIG. 12, the pixel 25 controlled from the display ON state to the display OFF state is controlled from the display ON state to the display OFF state at the selection timing Tpd of the pixel 25.

The selection timing Tpd of each pixel 25 is the timing at which the scanning signal Gate(1), Gate(2), . . . , or Gate(N) is supplied to the scanning line SGL to which the pixel 25 is coupled. In other words, the selection timing Tpd of each pixel 25 is the timing at which the gate driver 12 selects the scanning line SGL in the display period Pd.

As illustrated in FIG. 11, when the pixel 25 is controlled from the display OFF state to the display ON state at the selection timing Tpd of the pixel 25, the liquid crystal capacitance value changes from Cgref (=Cgoff) to Cgon at a predetermined inclination over time. When $k_1$ is the coefficient indicating the inclination of the liquid crystal capacitance value over time, a period $P_{ST}(r)$ until when the liquid crystal capacitance value reaches Cgon can be expressed by the following Expression (5):

$$P_{ST}(r)=(Cgon-Cgref)/k_1 \qquad (5)$$

As illustrated in FIG. 12, when the pixel 25 is controlled from the display ON state to the display OFF state at the selection timing Tpd of the pixel 25, the liquid crystal capacitance value changes from Cgon to Cgref (=Cgoff) at a predetermined inclination over time. When $k_2$ is the coefficient indicating the inclination of the liquid crystal capacitance value over time, the period $P_{ST}(r)$ until when the liquid crystal capacitance value reaches Cgref (=Cgoff) can be expressed by the following Expression (6):

$$P_{ST}(r)=(Cgref-Cgon)/k_2 \qquad (6)$$

In the above Expressions (5) and (6), the coefficients $k_1$ and $k_2$ have the same absolute value and different polarities. Specifically, the coefficient $k_1$ has positive polarity, and the coefficient $k_2$ has negative polarity. These coefficients $k_1$ and $k_2$ are predetermined values corresponding to the response speed of the liquid crystal layer 23. When $Cg_{S-1}(r)$ is the liquid crystal capacitance value corresponding to the pixel value immediately before the selection timing Tpd of the pixel 25 in one frame period (S-th frame period) illustrated in FIG. 2, that is, the pixel value in the previous frame (S-1-th frame) before the current frame (S-th frame), $Cg_S(r)$ is the liquid crystal capacitance value corresponding to the pixel value immediately after the selection timing Tpd of the pixel 25, that is, the pixel value in the current frame, and k is the absolute value of the coefficients $k_1$ and $k_2$, the period $P_{ST}(r)$ in the above Expressions (5) and (6) can be expressed by the following Expression (7):

$$P_{ST}(r)=|Cg_S(r)-Cg_{S-1}(r)|/k \qquad (7)$$

The liquid crystal capacitance value $Cg_{Sre}$ of each pixel 25 included in the detected capacitance value Craw$_S$ detected in the detection period Pt depends on a first period $P_L(n)$ from the selection timing Tpd of the pixel 25 in the display period Pd to a detection timing Tpt serving as the starting point of the detection operation in the detection period Pt. In the following description, the period $P_{ST}(r)$ expressed by the above Expression (7) is referred to as a "second period $P_{ST}(r)$".

Figure 13:
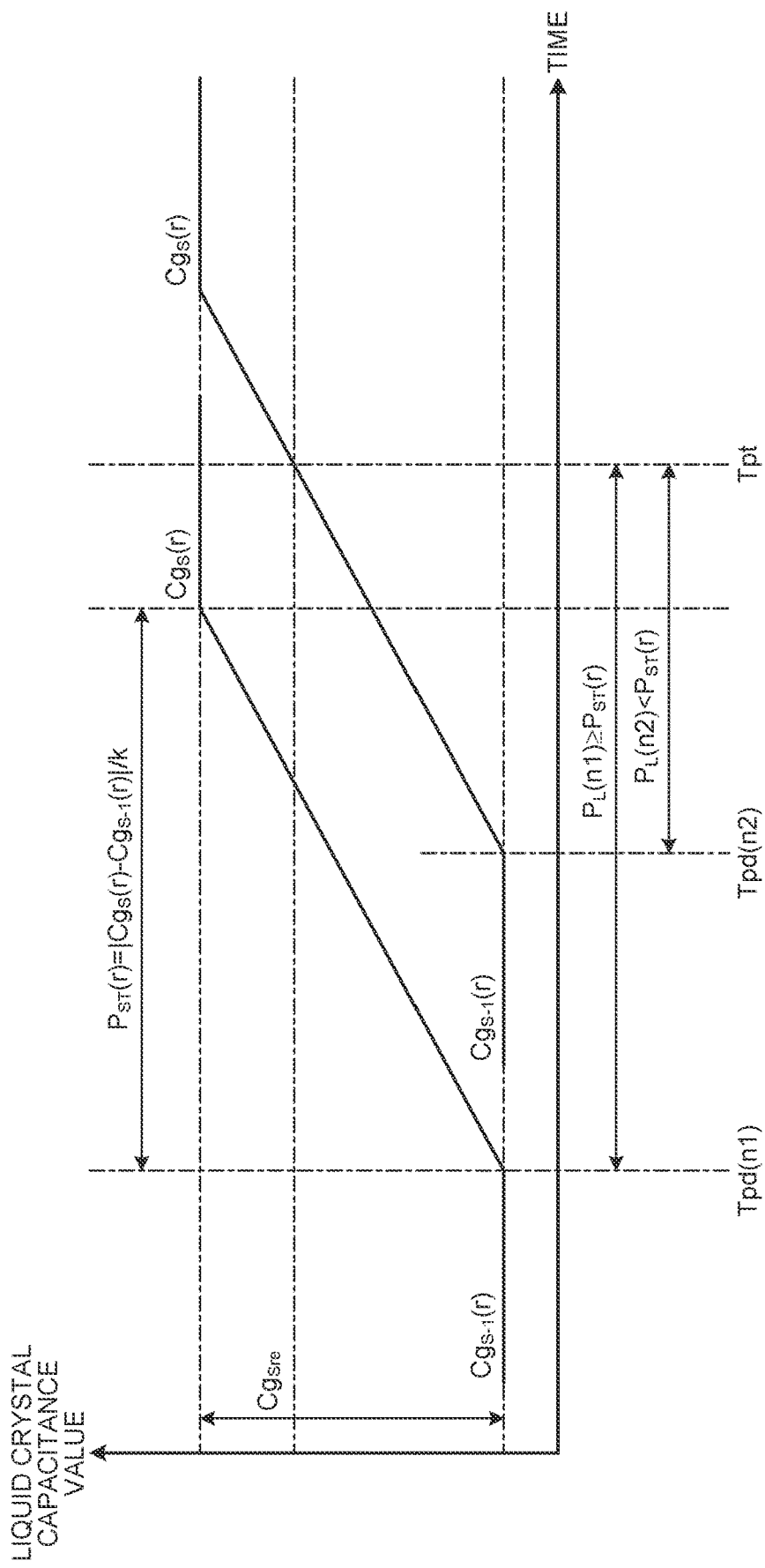
FIG. 13 is a diagram for explaining a method for calculating the liquid crystal capacitance value of each pixel included in the detected capacitance value detected in the detection period.

The following describes a method for calculating the liquid crystal capacitance value $Cg_{Sre}$ of each pixel 25 included in the detected capacitance value Craw$_S$ detected in the detection period Pt with reference to FIG. 13. FIG. 13 a diagram for explaining a method for calculating the liquid crystal capacitance value of each pixel included in the detected capacitance value detected in the detection period. FIG. 13 illustrates a case where the liquid crystal capacitance value $Cg_{S-1}(r)$ corresponding to the pixel value in the previous frame before the current frame is smaller than the liquid crystal capacitance value $Cg_S(r)$ corresponding to the pixel value in the current frame. FIG. 13 does not illustrate a case where the liquid crystal capacitance value $Cg_{S-1}(r)$ corresponding to the pixel value in the previous frame before the current frame is larger than the liquid crystal capacitance value $Cg_S(r)$ corresponding to the pixel value in the current frame. The following describes the pixels 25 coupled to the scanning lines SGL of the n1-th and the n2-th lines (1≤n1<n2≤N).

In FIG. 13, Tpd(n1) is the selection timing of each pixel 25 of the n1-th line, and Tpd(n2) is the selection timing of each pixel 25 of the n2-th line. In FIG. 13, the liquid crystal capacitance value $Cg_{S-1}(r)$ in each pixel 25 of the n1-th line is equal to the liquid crystal capacitance value $Cg_{S-1}(r)$ in each pixel 25 of the n2-th line. The liquid crystal capacitance value $Cg_S(r)$ in each pixel 25 of the n1-th line is equal to the liquid crystal capacitance value $Cg_S(r)$ in each pixel 25 of the n2-th line.

As illustrated in FIG. 13, in the pixel 25 of the n1-th line, the first period $P_L(n1)$ from the selection timing Tpd(n1) of the pixel 25 to the detection timing Tpt is equal to or longer than the second period $P_{ST}(r)$ until when the liquid crystal capacitance value increases from $Cg_{S-1}(r)$ to $Cg_S(r)$ ($P_L(n1)$ ≥$P_{ST}(r)$). In the pixel 25 provided in the region where the first period $P_L(n)$ from the selection timing Tpd of the pixel 25 to the detection timing Tpt is equal to or longer than the second period $P_{ST}(r)$ until when the liquid crystal capacitance value increases from $Cg_{S-1}(r)$ to $Cg_S(r)$ ($P_L(n1)$≥$P_{ST}(r)$), the liquid crystal capacitance value $Cg_{Sre}$ at the detection timing Tpt is $Cg_S(r)$ as expressed in the following Expression (8).

As illustrated in FIG. 13, in the pixel 25 of the n1-th line, the first period $P_L(n1)$ from the selection timing Tpd(n1) of the pixel 25 to the detection timing Tpt is equal to or longer than the second period $P_{ST}(r)$ until when the liquid crystal capacitance value increases from $Cg_{S-1}(r)$ to $Cg_S(r)$ ($P_L(n1)$≥$P_{ST}(r)$). In the pixel 25 provided in the region where the first period $P_L(n)$ from the selection timing Tpd (n) of the pixel 25 to the detection timing Tpt is equal to or longer than the second period $P_{ST}(r)$ from the selection timing Tpd of the pixel 25 to when the liquid crystal capacitance value reaches the value corresponding to the pixel value of the pixel 25 ($P_L(n)$≥$P_{ST}(r)$), the liquid crystal capacitance value $Cg_{Sre}(r)$ used to calculate the corrected capacitance value $Ccor_S$ can be expressed by the following Expression (8):

$$Cg_{Sre}(r)=Cg_S(r) \qquad (8)$$

By contrast, in the pixel 25 of the n2-th line, the first period $P_L(n2)$ from the selection timing Tpd(n2) of the pixel 25 to the detection timing Tpt is shorter than the second period $P_{ST}(r)$ until when the liquid crystal capacitance value increases from $Cg_{S-1}(r)$ to $Cg_S(r)$ ($P_L(n2)<P_{ST}(r)$). In the pixel 25 provided in the region where the first period $P_L(n)$ from the selection timing Tpd (n) of the pixel 25 to the detection timing Tpt is shorter than the second period $P_{ST}(r)$ from the selection timing Tpd of the pixel 25 to when the liquid crystal capacitance value reaches the liquid crystal capacitance value corresponding to the pixel value of the pixel 25 ($P_L(n)<P_{ST}(r)$), the liquid crystal capacitance value $Cg_{Sre}(r)$ used to calculate the corrected capacitance value $Ccor_S$ can be expressed by the following Expressions (9) and (10):

$$Cg_{Sre}(r)=(1-\alpha)Cg_{S-1}(r)+\alpha Cg_S(r) \qquad (9)$$

$$\alpha=P_L(n)/P_{ST}(r) \qquad (10)$$

By using the liquid crystal capacitance value $Cg_{Sre}(r)$ of the pixel 25 calculated by the above Expression (8) or the above Expressions (9) and (10) and calculating the corrected capacitance value CcorS by the above Expressions (1) and (2), the corrected capacitance value $Ccor_S$ can be calculated by considering that all the pixels 25 overlapping the detection electrode 31 are in the display OFF state independently of the image displayed on the display area 20.

Figure 14:
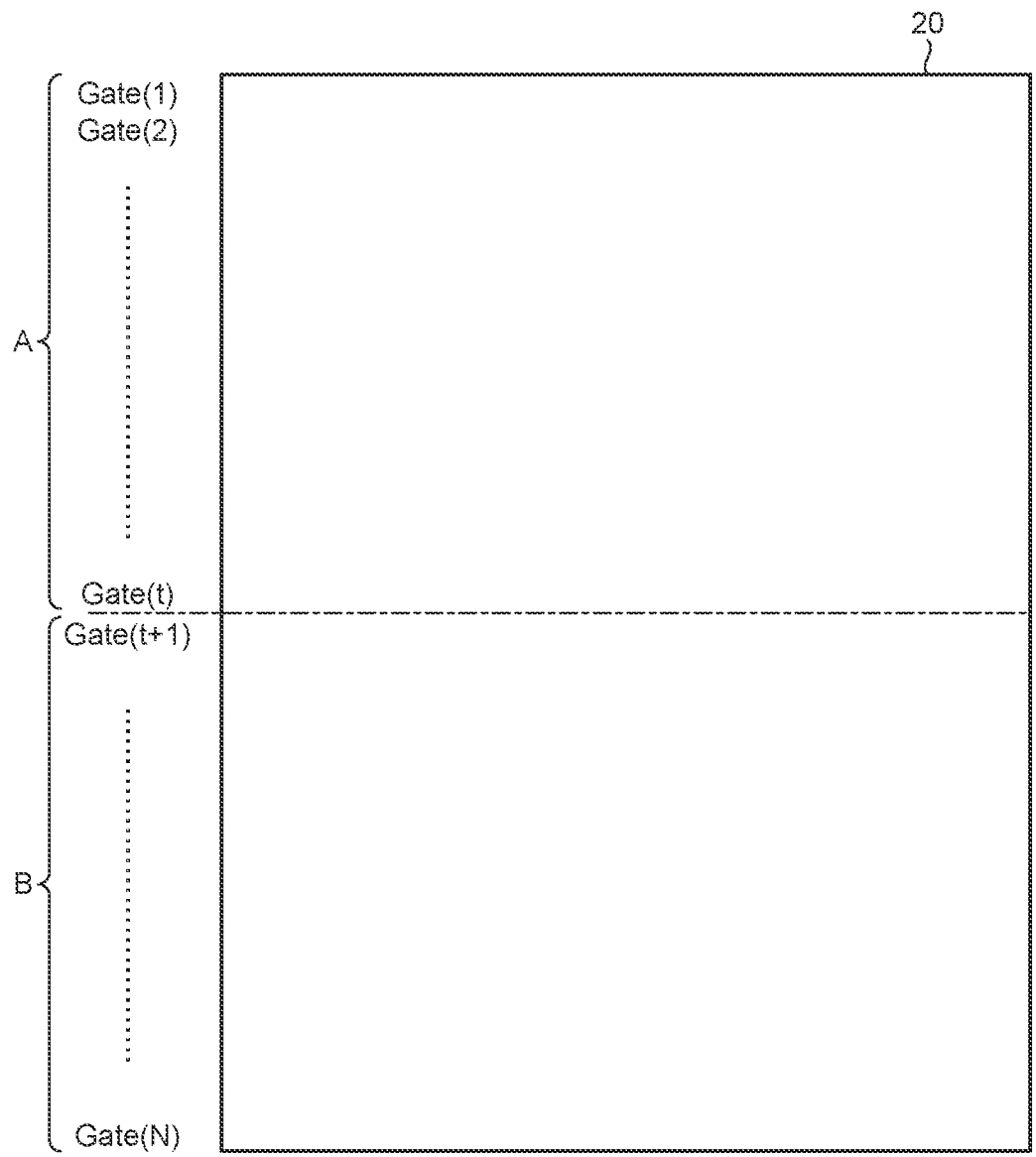
FIG. 14 is a diagram of regions on a display area when the state of the pixel can be either the display OFF state or the display ON state.
Figure 15:
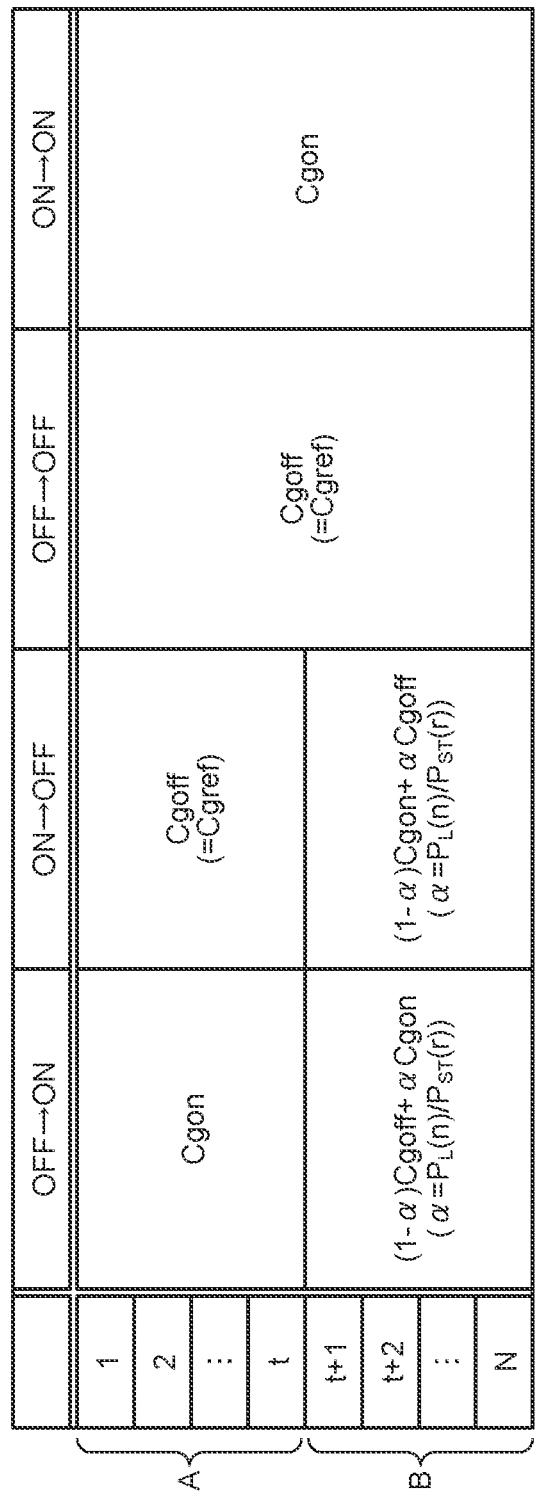
FIG. 15 is a diagram of the liquid crystal capacitance values corresponding to the pixel values of the pixels in the regions illustrated in FIG. 14.

Let us assume a case where the state of each pixel 25 in each frame can be either the display OFF state or the display ON state, that is, a case where the image displayed on the display area 20 is represented by two gradations with the pixels 25 in the display OFF state and the pixels 25 in the display ON state. FIG. 14 is a diagram of regions on the display area when the state of the pixel can be either the display OFF state or the display ON state. FIG. 15 is a diagram of the liquid crystal capacitance values corresponding to the pixel values of the pixels in the regions illustrated in FIG. 14. In FIGS. 14 and 15, A denotes a region (first region) where the first period $P_L(n)$ from the selection timing Tpd(n) of each pixel 25 to the detection timing Tpt is equal to or longer than the second period $P_{ST}(r)$ until when the liquid crystal capacitance value increases from Cgoff (=Cgref) corresponding the pixel value of the pixel 25 in the display OFF state to Cgon corresponding the pixel value of the pixel 25 in the display ON state ($P_L(n) \geq P_{ST}(r)$). B denotes a region (second region) where the first period $P_L(n)$ from the selection timing Tpd(n) of each pixel 25 to the detection timing Tpt is shorter than the second period $P_{ST}(r)$ until when the liquid crystal capacitance value increases from Cgoff (=Cgref) corresponding the pixel value of the pixel 25 in the display OFF state to Cgon corresponding the pixel value of the pixel 25 in the display ON state ($P_L(n) < P_{ST}(r)$).

When the pixel 25 is controlled from the display OFF state in the previous frame to the display ON state, the liquid crystal capacitance value $Cg_{Sre}(r)$ in the pixel 25 provided in the region A (first region) from the first line to the t-th line illustrated in FIG. 14 can be expressed by the following Expression (11) obtained by transforming the above Expression (8) (refer to FIG. 15).

$$Cg_{Sre}(r)=Cgon \qquad (11)$$

The liquid crystal capacitance value $Cg_{Sre}(r)$ in the pixel 25 provided in the region B (second region) from the t+1-th line to the N-th line illustrated in FIG. 14 can be expressed by the following Expression (12) obtained by transforming the above Expression (9) (refer to FIG. 15).

$$Cg_{Sre}(r)=(1-\alpha)Cgoff+\alpha Cgon \qquad (12)$$

When the pixel 25 is controlled from the display ON state in the previous frame to the display OFF state, the liquid crystal capacitance value $Cg_{Sre}(r)$ in the pixel 25 provided in the region A (first region) from the first line to the t-th line illustrated in FIG. 14 can be expressed by the following Expression (13) obtained by transforming the above Expression (8) (refer to FIG. 15).

$$Cg_{Sre}(r)=Cgoff(=Cgref) \qquad (13)$$

The liquid crystal capacitance value $Cg_{Sre}(r)$ in the pixel 25 provided in the region B (second region) from the t+1-th line to the N-th line illustrated in FIG. 14 can be expressed by the following Expression (14) obtained by transforming the above Expression (9) (refer to FIG. 15).

$$Cg_{Sre}(r)=(1-\alpha)Cgon+\alpha Cgoff \qquad (14)$$

When the pixel 25 remains in the display OFF state from the previous frame, the liquid crystal capacitance value $Cg_{Sre}(r)$ in the pixel 25 provided in the entire region from the first line to the N-th line illustrated in FIG. 14 can be expressed by the following Expression (15) obtained by transforming the above Expression (8) (refer to FIG. 15).

$$Cg_{Sre}(r)=Cgoff(=Cgref) \qquad (15)$$

When the pixel 25 remains in the display ON state from the previous frame, the liquid crystal capacitance value $Cg_{Sre}(r)$ in the pixel 25 provided in the entire region from the first line to the N-th line illustrated in FIG. 14 can be expressed by the following Expression (16) obtained by transforming the above Expression (8) (refer to FIG. 15).

$$Cg_{Sre}(r)=Cgon \qquad (16)$$

Figures 16, 17:
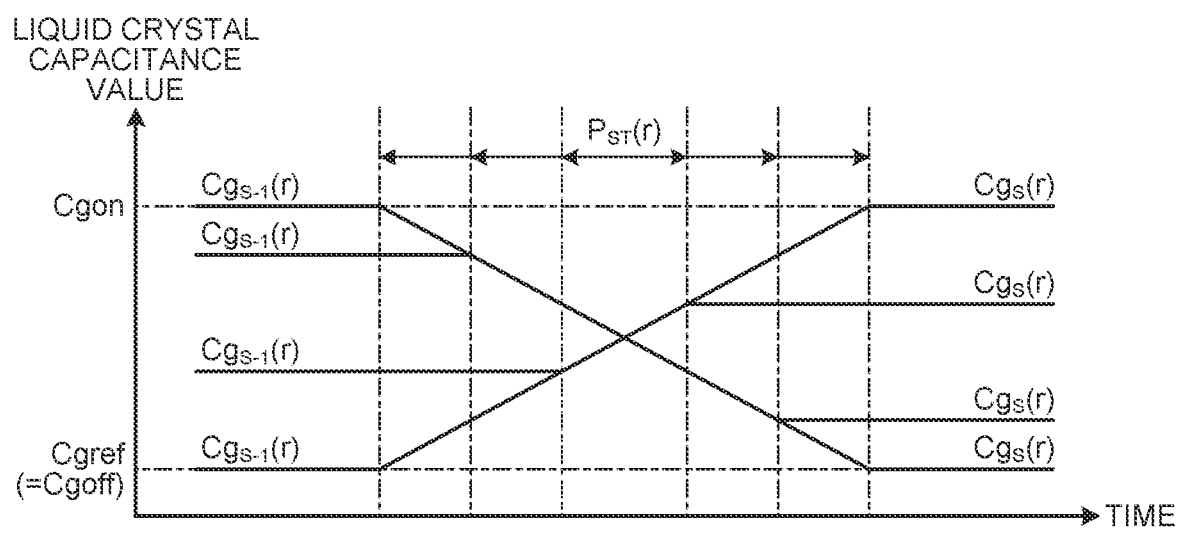
FIG. 16 is a diagram of the ratio between a first period and a second period set as a coefficient.
FIG. 17 is a diagram of change in liquid crystal capacitance when the state of the pixel can have an intermediate gradation.

FIG. 16 is a diagram of the ratio between the first period and the second period set as a coefficient. In FIG. 16, a ratio $\alpha$ ($=P_L(n)/P_{ST}(r)$) between the first period $P_L(n)$ and the second period $P_{ST}(r)$ in the region B (second region) is represented as $\alpha(t+1), \alpha(t+2), \ldots,$ and $\alpha(N)$.

When the state of each pixel 25 can be either the display OFF state or the display ON state, the liquid crystal capacitance value Cgoff (=Cgref) in the display OFF state, the liquid crystal capacitance value Cgon in the display ON state, and the second period $P_{ST}(r)$ can be regarded as fixed values.

In other words, in the pixel 25 provided in the region A (first region), the liquid crystal capacitance value $Cg_{Sre}(r)$ is always the liquid crystal capacitance value (Cgoff (=Cgref) or Cgon) in the display state (the display OFF state or the display ON state) of the pixel 25 in the current frame. In the pixel 25 provided in the region B (second region), the first period $P_L(n)$ is a variable determined by the scanning line (line) to which the pixel 25 is provided. As illustrated in FIG. 16, the ratio a ($=P_L(n)/P_{ST}(r)$) between the first period $P_L(n)$ and the second period $P_{ST}(r)$ used for calculation for the pixel 25 provided in the region B (second region) is set as a coefficient corresponding to the scanning line (line) to which the pixel 25 is provided. Therefore, the liquid crystal capacitance value $Cg_{Sre}(r)$ can be derived by obtaining the region in which each pixel 25 is provided (more specifically, the scanning line (line) to which the pixel 25 is provided), the display state (the display OFF state or the display ON state) of each pixel 25 in the previous frame, and the display state (the display OFF state or the display ON state) of each pixel 25 in the current frame as pixel information.

More specifically, when the first period $P_L(n)$ is equal to or longer than the second period $P_{ST}(r)$ ($P_L(n) \geq P_{ST}(r)$), in other words, when the ratio $\alpha$ ($=P_L(n)/P_{ST}(r)$) between the first period $P_L(n)$ and the second period $P_{ST}(r)$ is 1 or larger, the liquid crystal capacitance value (Cgoff (=Cgref) or Cgon) in the display state (the display OFF state or the display ON state) of the pixel 25 in the current frame is determined to be the liquid crystal capacitance value $Cg_{Sre}(r)$ at the detection timing as expressed by the above Expression (8). When the first period $P_L(n)$ is shorter than the second period $P_{ST}(r)$ ($P_L(n)<P_{ST}(r)$), in other words, when the ratio $\alpha$ ($=P_L(n)/P_{ST}(r)$) between the first period $P_L(n)$ and the second period $P_{ST}(r)$ is smaller than 1, the ratio a ($=P_L(n)/P_{ST}(r)$) between the first period $P_L(n)$ and the second period $P_{ST}(r)$ illustrated in FIG. 16 is substituted into the above Expression (9) to calculate the liquid crystal capacitance value $Cg_{Sre}(r)$ of each pixel 25 at the detection timing. By using the liquid crystal capacitance value $Cg_{Sre}(r)$ of each pixel 25 at the detection timing calculated in this manner and calculating the corrected capacitance value $Ccor_S$ by the above Expressions (1) and (2), the corrected capacitance value $Ccor_S$ can be calculated by considering that all the pixels 25 overlapping the detection electrode 31 are in the display OFF state.

Next, let us assume a case where each pixel 25 can have an intermediate gradation from the display OFF state to the display ON state, that is, a case where the image displayed on the display area 20 is displayed with three or more gradations including the display OFF state and the display ON state. FIG. 17 is a diagram of change in liquid crystal capacitance when the state of the pixel can have an intermediate gradation.

When the image displayed on the display area 20 is composed of the pixels with 256 gradations, for example, and the gradations change between the frames, the liquid crystal capacitance value of each pixel 25 in each frame is a value corresponding to the gradation value of each pixel 25 in each frame within the range from the liquid crystal capacitance value Cgoff (=Cgref) in the display OFF state to the liquid crystal capacitance value Cgon in the display ON state. In this case, as illustrated in FIG. 17, the value of the second period $P_{ST}(r)$ until when the liquid crystal capacitance value $Cg_{S-1}(r)$ corresponding to the pixel value (gradation value) in the previous frame reaches the liquid crystal capacitance value $Cg_S(r)$ corresponding to the pixel value (gradation value) in the current frame varies depending on the liquid crystal capacitance value $Cg_{S-1}(r)$ and the liquid crystal capacitance value $Cg_S(r)$. Specifically, when the display area 20 is composed of the pixels 25 with 256 gradations, there are 256×256=65536 possible values for the second period $P_{ST}(r)$. Therefore, the liquid crystal capacitance value $Cg_{Sre}(r)$ of each pixel 25 is preferably calculated by using the above Expression (8) or the above Expressions (9) and (10) as described above instead of deriving the liquid crystal capacitance value $Cg_{Sre}(r)$ of each pixel 25 by setting the ratio between the first period $P_L(n)$ and the second period $P_{ST}(r)$ as the coefficient as illustrated in FIG. 16.

Figures 18, 19:
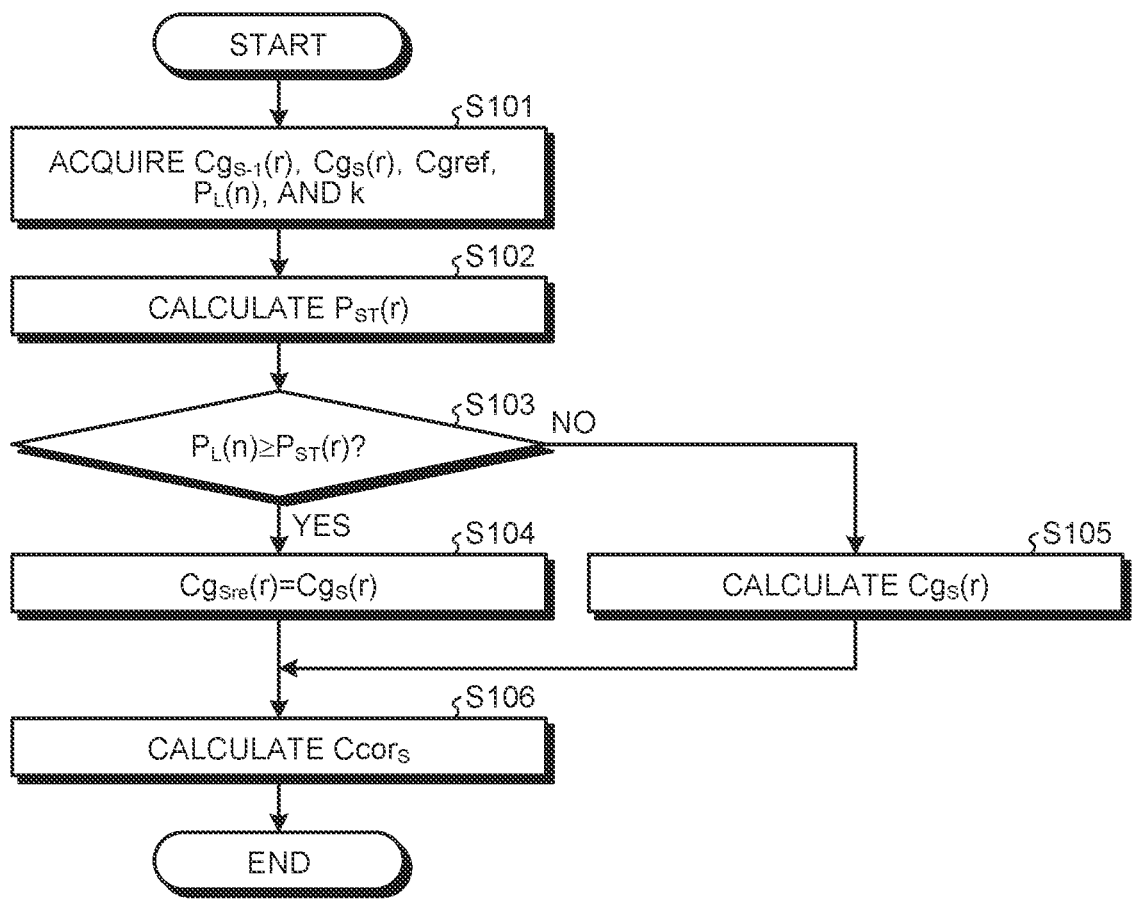
FIG. 18 is a flowchart of an example of corrected capacitance value calculation performed by a detection device according to the embodiment.
FIG. 19 is a diagram of an example of a liquid crystal capacitance value table for the pixel value (gradation value) of each pixel.

The following describes corrected capacitance value calculation that enables calculating the corrected capacitance value $Ccor_S$ independently of the pixel value (gradation value) of the pixel 25 in the liquid crystal display device 1 according to the embodiment with reference to FIG. 18. FIG. 18 is a flowchart of an example of the corrected capacitance value calculation performed by a detection device according to the embodiment. FIG. 18 illustrates the processing performed when the display period Pd and the detection period Pt are arranged in a time-division manner in one frame period 1F as illustrated in FIG. 2.

As a prerequisite for the corrected capacitance value calculation illustrated in FIG. 18, the storage unit 42 of the detection circuit 40 stores therein in advance various parameters for correcting the detected capacitance value $Craw_S$ by the capacitance value corrector 41.

Figure 20:
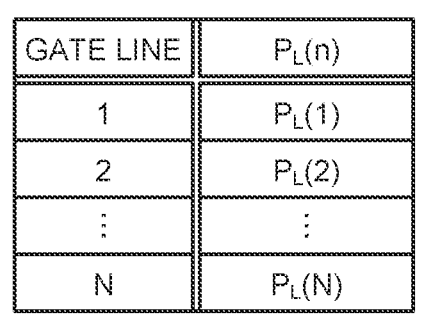

FIG. 19 is a diagram of an example of a liquid crystal capacitance value table for the pixel value (gradation value) of each pixel. FIG. 20 is a diagram of an example of a first period table for the scanning line to which each pixel is coupled.

The storage unit 42 stores therein the liquid crystal capacitance value Cg corresponding to the pixel value (gradation value) of each pixel 25 as various parameters for correcting the detected capacitance value $Craw_S$ by the capacitance value corrector 41 in the form of the liquid crystal capacitance value table illustrated in FIG. 19. The reference capacitance value Cgref in the display OFF state is stored as the liquid crystal capacitance value at a pixel value (gradation value) of 0 in the liquid crystal capacitance value table illustrated in FIG. 19.

The storage unit 42 stores therein the first period $P_L(n)$ corresponding to the scanning line (line) to which each pixel 25 is coupled as the first period table illustrated in FIG. 20. The storage unit 42 also stores therein the absolute value k of the coefficient (hereinafter also referred to simply as "coefficient k") corresponding to the response speed of the liquid crystal layer 23.

The liquid crystal capacitance value table illustrated in FIG. 19, the first period table illustrated in FIG. 20, and the coefficient k may be stored in the controller 100. While the pixel 25 has 256 gradations, that is, the gradation value is 8-bit data in the example illustrated in FIG. 19, the present disclosure is not limited by the number of gradations of the pixel 25.

Based on the pixel information received from the controller 100, for example, the capacitance value corrector 41 acquires the liquid crystal capacitance value $Cg_{S-1}(r)$ corresponding to the pixel value (gradation value) in the previous frame period S-1 of each pixel 25 overlapping the detection electrode 31, the liquid crystal capacitance value $Cg_S(r)$ corresponding to the pixel value (gradation value) in the current frame period S, the reference capacitance value Cgref, the first period $P_L(n)$ from the selection timing Tpd of each pixel 25 to the detection timing Tpt, and the coefficient k from the storage unit 42 (Step S101). The pixel information received from the controller 100 includes the line to which each pixel 25 is provided, the pixel value (gradation value) of each pixel 25 in the previous frame period S-1, and the pixel value (gradation value) of each pixel 25 in the current frame period S, for example.

Subsequently, the capacitance value corrector 41 calculates the second period $P_{ST}(r)$ from the selection timing Tpd of each pixel 25 to when the liquid crystal capacitance value reaches $Cg_S(r)$ using the above Expression (7) (Step S102).

The capacitance value corrector 41 determines whether the first period $P_L(n)$ is equal to or longer than the second period $P_{ST}(r)$ ($P_L(n) \geq P_{ST}(r)$) (Step S103).

If the first period $P_L(n)$ is equal to or longer than the second period $P_{ST}(r)$ ($P_L(n) \geq P_{ST}(r)$) (Yes at Step S103), in other words, if the ratio a ($=P_L(n)/P_{ST}(r)$) between the first period $P_L(n)$ and the second period $P_{ST}(r)$ is 1 or larger, the capacitance value corrector 41 determines the liquid crystal capacitance value $Cg_S(r)$ corresponding to the pixel value in the current frame period S to be the liquid crystal capacitance value $Cg_{Sre}(r)$ of each pixel 25 at the detection timing as expressed by the above Expression (8) (Step S104) and calculates the corrected capacitance value $Ccor_S$ by the above Expressions (1) and (2) (Step S106).

If the first period $P_L(n)$ is shorter than the second period $P_{ST}(r)$ ($P_L(n)<P_{ST}(r)$) (No at Step S103), in other words, if the ratio $\alpha$ ($=P_L(n)/P_{ST}(r)$) between the first period $P_L(n)$ and the second period $P_{ST}(r)$ is smaller than 1, the capacitance value corrector 41 calculates the liquid crystal capacitance value $Cg_{Sre}(r)$ of each pixel 25 at the detection timing using the above Expressions (9) and (10) (Step S105). The capacitance value corrector 41 uses the calculated liquid crystal capacitance value $Cg_{Sre}(r)$ of each pixel 25 at the detection timing and calculates the corrected capacitance value $Ccor_S$ by the above Expressions (1) and (2) (Step S106).

Therefore, a corrected capacitance value $Ccor_S$ can be calculated by considering that all the pixels 25 overlapping the detection electrode 31 are in the display OFF state independently of the image displayed on the display area 20.

The capacitance value corrector 41 performs the corrected capacitance value calculation illustrated in FIG. 18 on the detected capacitance value $Craw_S$ generated in all the detection electrodes 31. Thus, deterioration in detection accuracy due to change in the capacitance value of the detection electrodes 31 caused by display operations can be suppressed, and touch detection can be performed properly.

The liquid crystal display device 1 according to the present embodiment can suppress deterioration in detection accuracy due to change in the capacitance value of the detection electrodes caused by display operations.

While an exemplary embodiment according to the present disclosure has been described, the embodiment is not intended to limit the present disclosure. The contents disclosed in the embodiment are given by way of example only, and various modifications may be made without departing from the spirit of the present disclosure. Appropriate modifications made without departing from the spirit of the present disclosure, for example, naturally fall within the technical scope of the present invention.

What is claimed is:

1. A liquid crystal display device comprising:
a liquid crystal layer provided between a first substrate and a second substrate;
a detection electrode configured to detect an external proximity object;
a plurality of pixels overlapping the detection electrode in plan view; and
a detection circuit configured to detect a detected capacitance value generated in the detection electrode, wherein
a liquid crystal capacitance value generated between each of the pixels and the detection electrode includes a first capacitance value at a first gradation and a second capacitance value at a second gradation smaller than the first gradation, and
the detection circuit corrects the detected capacitance value based on a ratio between number of pixels with the first gradation and number of pixels with the second gradation out of the pixels.

2. The liquid crystal display device according to claim 1, wherein
the first gradation is set to a gradation of 95% or larger in the pixel, and
the second gradation is set to a gradation of 5% or smaller in the pixel.

3. The liquid crystal display device according to claim 1, wherein
the second capacitance value is used as a reference capacitance value of the liquid crystal capacitance value, and
the detection circuit corrects the detected capacitance value by integrating a difference between the first capacitance value and the reference capacitance value for the number of pixels with the first gradation and subtracting the integrated value from the detected capacitance value.

4. A liquid crystal display device comprising:
a liquid crystal layer provided between a first substrate and a second substrate;
a detection electrode configured to detect an external proximity object;
a plurality of pixels overlapping the detection electrode in plan view; and
a detection circuit configured to detect a detected capacitance value generated in the detection electrode, wherein
a capacitance value at a predetermined gradation of each of the pixels is used as a reference capacitance value of a liquid crystal capacitance value generated between the pixel and the detection electrode, and
the detection circuit corrects the detected capacitance value by calculating, for each of the pixels, a difference between the liquid crystal capacitance value of the pixel at a detection timing of the detected capacitance value and the reference capacitance value, adding up the differences of the respective pixels, and subtracting the added value from the detected capacitance value.

5. The liquid crystal display device according to claim 4, wherein the gradation of the pixel corresponding to the reference capacitance value is a gradation of 5% or smaller in the pixel.

6. The liquid crystal display device according to claim 5, further comprising
a plurality of scanning lines to which the pixels are coupled, wherein
the liquid crystal capacitance value includes a first capacitance value at a first gradation and a second capacitance value at a second gradation smaller than the first gradation,
the first gradation is set to a gradation of 95% or larger in the pixel,
the second gradation is set to a gradation of 5% or smaller in the pixel,
a period from a selection timing of the scanning line to which the pixel is coupled to the detection timing of the detected capacitance value is defined as a first period,
a period from the selection timing of the scanning line to which the pixel is coupled to when the liquid crystal capacitance value reaches the first capacitance value or the second capacitance value corresponding to the gradation of the pixel is defined as a second period,
a region where the first period is equal to or longer than the second period is defined as a first region,
a region where the first period is shorter than the second period is defined as a second region,
the detection circuit determines, when the pixel is provided in the first region, the first capacitance value to be the liquid crystal capacitance value of the pixel at the detection timing, and
the detection circuit determines, when the pixel is provided in the second region, a value obtained by multiplying the first capacitance value by a coefficient corresponding to a ratio between the first period and the second period to be the liquid crystal capacitance value of the pixel at the detection timing.

7. The liquid crystal display device according to claim 4, wherein the detection circuit calculates a value $Ccor_S$ resulting from correcting the detected capacitance value using Expression (1) and Expression (2)

$$Ccor_S = Craw_S - \sum_{r=1}^{R} \Delta Cg_S(r) \qquad (1)$$

$$\Delta Cg_S(r) = Cg_{Sre}(r) - Cgref \qquad (2)$$

where $Craw_S$ is the detected capacitance value, R is number of the pixels, $Cg_{Sre}(r)$ is the liquid crystal capacitance value at the detection timing, $Cgref$ is the reference capacitance value, and $Ccor_S$ is the value resulting from correcting the detected capacitance value.

8. The liquid crystal display device according to claim 7, further comprising:

a plurality of scanning lines to which the pixels are coupled, wherein a period from a selection timing of the scanning line to which the pixel is coupled to the detection timing of the detected capacitance value is defined as a first period, a period from the selection timing of the scanning line to which the pixel is coupled to when the liquid crystal capacitance value reaches the capacitance value corresponding to a gradation value of the pixel is defined as a second period, and the detection circuit determines, when the first period is equal to or longer than the second period, the capacitance value corresponding to the gradation value of the pixel to be the liquid crystal capacitance value of the pixel at the detection timing.

9. The liquid crystal display device according to claim 8, wherein the detection circuit calculates, when the first period is shorter than the second period, a liquid crystal capacitance value $Cg_{Sre}(r)$ of each of the pixels at the detection timing using Expression (3) and Expression (4)

$$Cg_{Sre}(r) = (1-\alpha)Cg_{S-1}(r) + \alpha Cg_S(r) \qquad (3)$$

$$\alpha = P_L(n)/P_{ST}(r) \qquad (4)$$

where $Cg_{S-1}(r)$ is a liquid crystal capacitance value corresponding to the gradation value of the pixel immediately before the selection timing, $Cg_S(r)$ is a liquid crystal capacitance value corresponding to the gradation value of the pixel immediately after the selection timing, $P_L(n)$ is the first period, and $P_{ST}(r)$ is the second period.

10. The liquid crystal display device according to claim 9, wherein the detection circuit calculates the second period $P_{ST}(r)$ using Expression (5)

$$P_{ST}(r) = |Cg_S(r) - Cg_{S-1}(r)|/k \qquad (5)$$

where k is an absolute value of a coefficient indicating an inclination of the capacitance value over time from the liquid crystal capacitance value $Cg_{S-1}(r)$ to the liquid crystal capacitance value $Cg_S(r)$.

11. The liquid crystal display device according to claim 1, comprising a plurality of the detection electrodes.

12. The liquid crystal display device according to claim 1, wherein the liquid crystal display device is a vertical-electric-field reflective liquid crystal display device.

* * * * *